July 29, 1958    J. H. LATZEN    2,845,290
BALL JOINT

Filed Sept. 20, 1956    3 Sheets-Sheet 1

INVENTOR.
Josef H. Latzen
BY
Patent Agent

July 29, 1958 J. H. LATZEN 2,845,290
BALL JOINT
Filed Sept. 20, 1956 3 Sheets-Sheet 2

INVENTOR.
Josef H. Latzen
BY

July 29, 1958     J. H. LATZEN     2,845,290
BALL JOINT

Filed Sept. 20, 1956     3 Sheets-Sheet 3

INVENTOR.
Josef H. Latzen
BY
Patent Agent

United States Patent Office 2,845,290
Patented July 29, 1958

2,845,290

BALL JOINT

Josef H. Latzen, Schurkesfeld, Strump, Germany, assignor to A. Ehrenreich & Cie, Dusseldorf-Oberkassel, Germany Application September 20, 1956, Serial No. 611,082

Claims priority, application Germany October 21, 1955

2 Claims. (Cl. 287—90)

The present invention relates to a ball joint as supporting joint for the suspension of front wheels on tie rods of motor vehicles, and is particularly directed to such a ball joint with the ball head on top of the ball stud.

Ball joints for this purpose are known according to which the flange-like extensions of the casing of the joint are connected with the steering tie rod for instance are screwed or welded thereto.

The flange-like extensions of such ball joints prevent the tie rods from being closely arranged to the wheels which is a certain drawback with regard to the spring action and steering movement of the wheels and also for the dimensioning of the tie rods, joint parts and the supports for the steering knuckles. Therefore, ball joints have been suggested which are provided with a holding stud on the casing of the joint which stud enters a bore of the tie rod. The stud provided with a thread is secured to the tie rod by means of a nut. Such a ball joint, however, is rather expensive in production inasmuch as the stud has to be produced by cutting or turning it out from the solid on the casing. Furthermore, the provision of a lubricant chamber above the supporting ball portion requires a further bore in said stud.

It is, therefore, an object of the present invention to provide a ball joint of the above mentioned general type which will overcome the drawbacks set forth above.

It is another object of this invention to provide a ball joint as supporting joint for the suspension of front wheels of motor vehicles which will considerably reduce the costs of production of such ball joints.

For the sake of completeness, it may be mentioned that joints are known the casing of which is designed as a drawn cup which casing is particularly suitable for supporting joints due to their low production costs, inasmuch as it is not necessary to cut or turn out from the solid a supporting stud.

It is a further object of the present invention to improve the last mentioned type of joints. To this end, according to the present invention, the casing drawn into a joint cup is provided with a bell-shaped extension forming a connecting screw. The bell-shaped extension may be drawn from the joint cup or socket portion which carries the upper ball portion so that the joint cup or socket and said extension may be produced in a single working step. In order to prevent the ball cup or socket, especially an elastic ball socket, from entering the bell-shaped extension, a disc is provided between said extension and the ball socket insert. This disc rests on the joint upper portion and forms the bottom of a lubricating chamber formed by said bell-shaped extension. The fact that the bell-shaped extension simultaneously forms a lubricating storage chamber, makes an additional lubricant bore serving as storage chamber superfluous as it was necessary heretofore with casings having a holding stud cut out from the casing.

According to a further development of the invention, the bell-shaped extension extends through a bore of the joint socket carrying the upper portion of the ball head. The said bell-shaped extension is provided with a flange extending between the joint or ball socket and the ball socket insert. In this way, the disc forming the bottom of the lubricant storage chamber as shown in Fig. 1 becomes superfluous inasmuch as the flange takes over this task of the disc and prevents a displacement of the elastic ball socket insert.

The lower joint cup portion closing off the casing may be provided with a collar surrounding the lower marginal portion of the joint cup member receiving the supporting ball head portion.

When employing an elastic ball socket insert, it is advantageous to draw the same with its lower marginal portion up to below the horizontal central plane of the ball head. In this way, the ball head is held by itself in its insert.

The above mentioned objects and advantages of the invention will appear more clearly from the following specification in connection with the accompanying drawings, in which.

Figure 1:
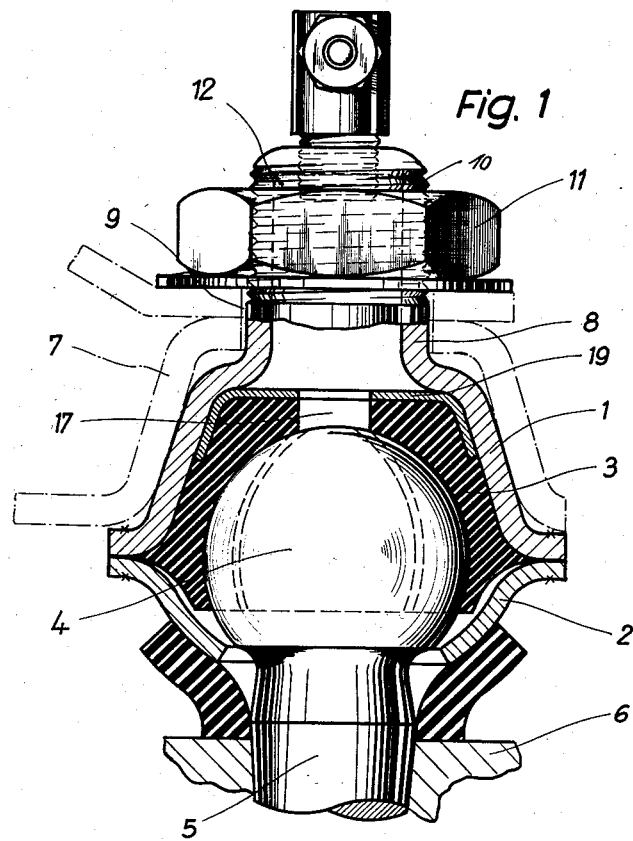
Fig. 1 is a partial section through a ball joint according to the invention showing a bell-shaped extension forming an integral part with the drawn upper ball socket.
Figure 2:
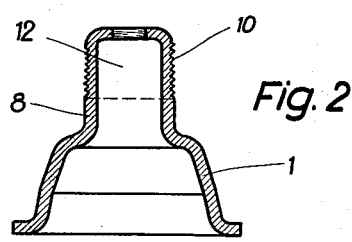
Fig. 2 is a section on a reduced scale through the joint cup upper portion with bell-shaped extension.
Figure 3:
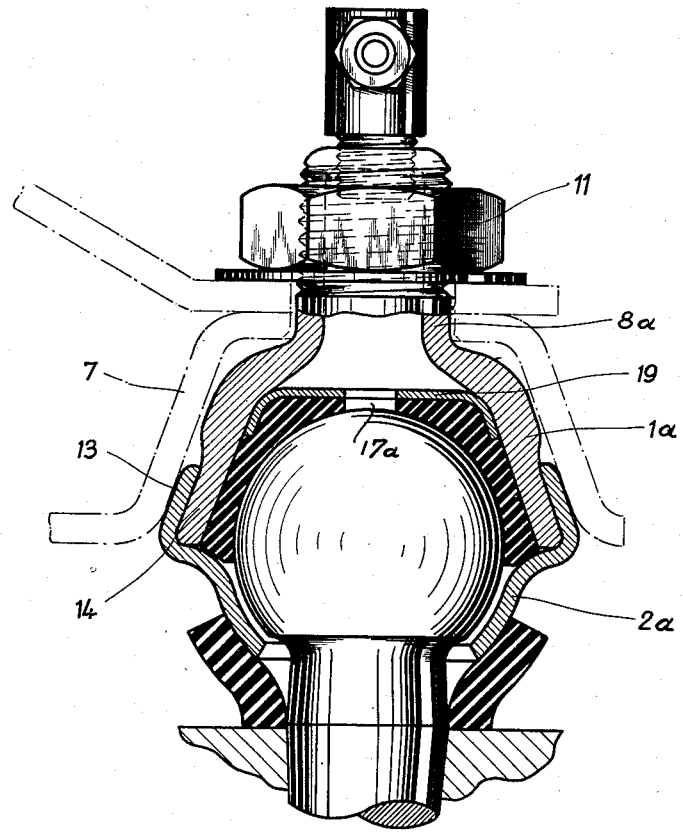
Fig. 3 is a section through a ball joint of the type set forth in Fig. 1 in which the joint lower socket is provided with a collar.

Referring now to the drawings in detail, the bell-shaped joint casing is formed by the drawn portions 1 and 2 of which the upper joint socket 1 receives in a manner known per se the ball socket insert 3 with the supporting portion of the ball head 4. The ball stud 5 is received in the support 6 for the steering knuckles, whereas the socket 1 rests in the steering tie rod 7. The parts 1 and 2 have their lateral flange-like extensions interconnected in any convenient manner for instance by spot welding as shown in Figs. 1 and 3. In order to hold the drawn casing in the tie rod 7, the casing is provided with a drawn bell-shaped extension 8 which extends through a bore 9 of the tie rod. The bell-shaped extension is together with the socket 1 drawn in a single working operation and is provided with a thread 10 adapted to receive the nut 11. The bell-shaped extension forms a lubricant storage chamber 12 above the ball socket insert 3. Lubricant can thus pass from said chamber 12 through a bore 17 in the ball socket insert into the space between the latter and the ball head 4. The ball socket insert 3 may for instance be of rubber.

In order to prevent the elastic ball socket insert 3 to displace itself into the lubricant storage chamber 12, there is provided a bottom plate 19 which rests on the inner wall of the joint socket 1. When employing a ball socket insert of steel or the like, the bottom plate will become superfluous.

Figure 4:
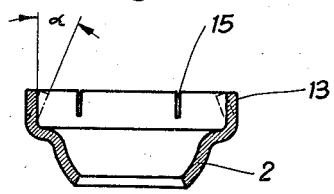
Fig. 4 shows on a reduced scale the lower joint socket prior to its installation.

According to the embodiment shown in Figs. 3 and 4, the upper joint socket 1a is in a similar manner provided with a bell-shaped extension 8a, whereas the lower socket 2a is provided with a collar 13 which, when installing the elements of the joint, is for instance bent around the lower marginal portion 14 of the socket 1a. The collar 13 is provided with notches 15 (Fig. 4) to facilitate the bending of the collar around the marginal portion of the socket 1a.

Figure 5:
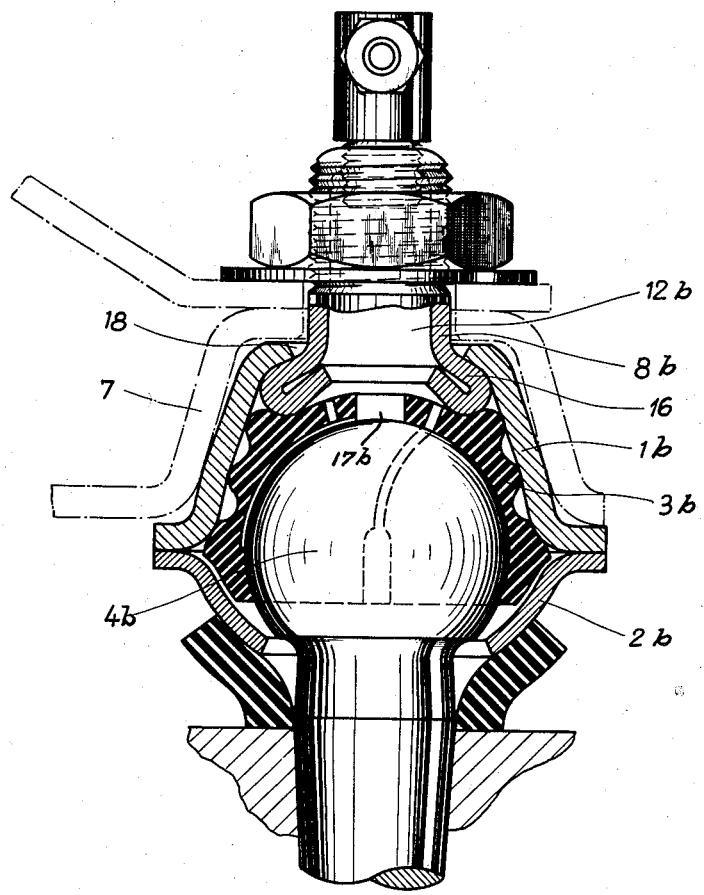
Fig. 5 is a further embodiment of a ball joint according to the invention in which the bell-shaped extension is designed as a separate part.

The embodiment shown in Fig. 5 shows the bell-shaped extension 8b provided with a flange-like bent portion 16. The bell-shaped extension 8b extends through a bore 18 of the upper socket 1b. The bent portion 16 rests between the upper socket 1b and the ball socket insert 3b which latter is provided with deformation ribs known per se which are arranged concentrically and extend radially. These deformation ribs are adapted to enter the grooves therebetween when the joint is under a dynamic load. A displacement of the elastic socket insert 3b into the lubricant storage chamber 12b is prevented by the flanged or bent portions 16. Also with this embodiment, the lower socket 2b may in conformity with the showing of Figs. 3 and 4 be provided with a collar surrounding the lower marginal portion of the upper socket.

As will be particularly evident from Figs. 1 and 5, the elastic socket insert 3, 3b may extend below the horizontal center plane of the ball head 4, 4b. In this way, the ball head 4, 4b is held in the insert 3, 3b by the latter itself. When inserting the ball head 4, 4b into its insert 3, 3b, the lower marginal portion of the insert 3, 3b is bent outwardly to such an extent that the upper ball head portion extends into the socket insert. When further moving the ball head inwardly, the lower marginal portion of the socket insert will surround a portion of the lower ball head section.

It is, of course, understood that the present invention is, by no means, limited to the particular constructions shown in the drawings but also comprises any modifications within the scope of the appended claims.

What I claim is:

1. In combination in a ball joint for wheel suspensions of vehicles, which includes a stud and a ball head thereon to be journalled in said ball joint: a lower socket, an upper socket connected to said lower socket and forming a housing therewith, said upper socket being provided with a hollow cup-shaped extension extending outwardly from said upper socket in the direction of the longitudinal axis thereof and having its outside provided with a thread so as to form a threaded shank for said housing to permit connection of the latter to a motor vehicle, an elastic insert arranged between and confined by said housing and said ball head and provided with an inner surface having a contour corresponding to the outer contour of said ball head and engaging the same, the interior of said cup-shaped extension forming a lubricant-receiving chamber, a plate interposed between said elastic insert and said cup-shaped extension to prevent said elastic insert from displacing itself into said cup-shaped extension, and passage means extending through said plate and said insert and establishing communication between said chamber and the outer surface of said ball head.

2. In combination in a ball joint for wheel suspensions of vehicles, which includes a stud and a ball head thereon to be journalled in said ball joint: a lower socket, an upper socket connected to said lower socket and forming a housing therewith, the upper end of said upper socket having a bore therethrough, a hollow cup-shaped member extending from the inside of said upper socket through the bore therethrough toward the outside of said upper socket in the direction of the longitudinal axis of said upper socket and having its outside provided with a thread so as to form a threaded shank for said housing to permit connection of the latter to a motor vehicle, the outer end of said cup-shaped member being closed and the inner end of said cup-shaped member being open and having a flanged portion embraced by the upper end of said upper socket, an insert arranged between said ball head on one hand and said upper socket and said flanged portion on the other hand and provided with an inner surface having a contour corresponding to the outer contour of said ball head and engaging the same, the interior of said cup-shaped member forming a lubricant-receiving chamber, and passage means extending through said insert and establishing communication between said chamber and the outer surface of said ball head.

References Cited in the file of this patent

UNITED STATES PATENTS

| 2,124,034 | Hufferd | July 19, 1938 |

FOREIGN PATENTS

| 133,588 | Australia | July 18, 1949 |
| 306,350 | Great Britain | Feb. 21, 1929 |
| 720,912 | Germany | May 19, 1942 |